United States Statutory Invention Registration [19]

[11] Reg. Number: H715

Greenhalgh [43] Published: Dec. 5, 1989

[54] RECOVERY OF MERCURY FROM ACID WASTE RESIDUES

[75] Inventor: Wilbur O. Greenhalgh, Richland, Wash.

[73] Assignee: The United States of America as represented by the United States Department of Energy, Washington, D.C.

[21] Appl. No.: 19,834

[22] Filed: Feb. 27, 1987

[51] Int. Cl.[4] ..... C22B 3/00

[52] U.S. Cl. ..... 75/109; 210/914; 210/711; 210/719; 75/101 R; 75/121; 423/109; 423/132; 423/4

[58] Field of Search ..... 75/101 R, 103, 109, 75/121; 210/702, 704, 709, 711, 719; 423/109

[56] References Cited

U.S. PATENT DOCUMENTS

| | | | |
|---|---|---|---|
| 3,679,396 | 7/1971 | Stenger | 75/109 |
| 3,695,838 | 10/1972 | Knepper | 75/109 |
| 3,701,651 | 10/1972 | Hack et al. | 75/109 |
| 4,599,177 | 7/1986 | Hayashi et al. | 210/718 |

OTHER PUBLICATIONS

Bailar, Jr., J. C. et al., *Comprehensive Inorganic Chemistry,* vol. III, Pergamon Press, 1972, pp. 277, 279–283 and 293–294 and 315–316.

*Primary Examiner*—Edward A. Miller
*Attorney, Agent, or Firm*—Edward V. Hiskes; Robert Southworth, III; Judson R. Hightower

[57] ABSTRACT

Mercury can be recovered from nitric acid-containing fluids by reacting the fluid with aluminum metal to produce mercury metal, and then quenching the reactivity of the nitric acid prior to nitration of the mercury metal.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

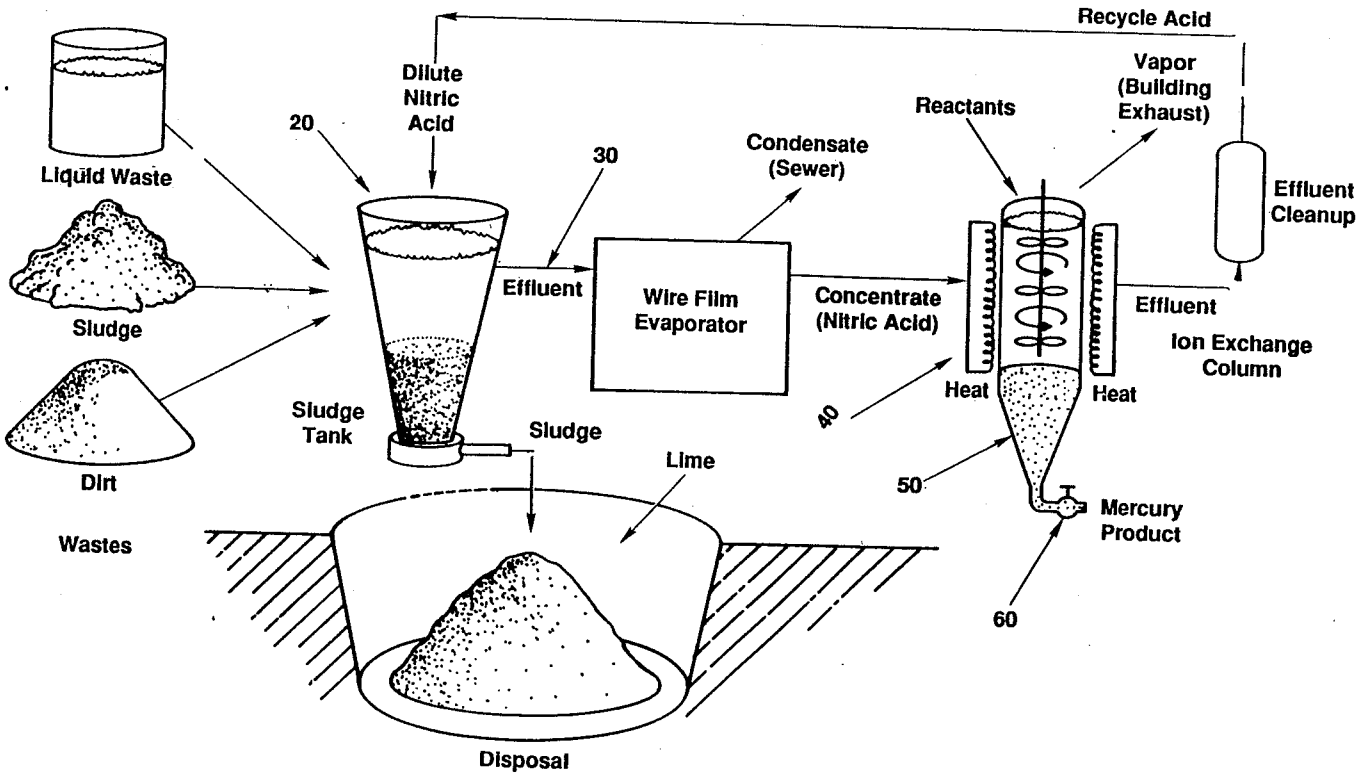
Fig. 1. Mercury Recovery Process

RECOVERY OF MERCURY FROM ACID WASTE RESIDUES

GOVERNMENT CONTRACT

This invention was made or conceived in the course of or under a contract with the U.S. Department of Energy, under Contract No. DE-AC06-76-FF-02170.

BACKGROUND OF THE INVENTION

This invention relates in general to processes for recovery of mercury from waste residues, and more particularly to a process for recovering mercury compounds from solutions containing nitric acid.

The prior art discloses numerous methods for recovery or removal of mercury from liquids, but none designed for this application. For example, Townsend U.S. Pat. No. 4,028,236, Gerow U.S. Pat. No. 3,802,910, Nolte U.S. Pat. No. 3,788,842, and Stenger U.S. Pat. No. 3,679,396 disclose various schemes for removal of elemental mercury. These work by means of amalgam formation with another metal.

Some prior art schemes for mercury removal, such as Hack U.S. Pat. No. 3,701,651, Cadmus U.S. Pat. No. 3,764,528 and Knepper U.S. Pat. No. 3,695,838 are restricted to non-acid solutions.

Kinoshita U.S. Pat. No. 4,057,423 teaches a process for removing mercury from sulfuric acid vapors. This process involves contacting acid vapor with metals having a reducing potential greater than that of mercury. The mercury is recovered from vapor phase sulfuric acid rather than from a liquid solution.

OBJECTS OF THE INVENTION

Thus, it is the object of this invention to provide an economical means for recovery of mercury from highly acidic sludges and solutions, particularly those which contain nitric acid.

SUMMARY OF THE INVENTION

Mercury is recovered from process sludge by dissolving the sludge in acid and thereafter adding powdered aluminum. Liquid mercury collects on the bottom of the reaction vessel.

In one application, the invention is used for recycling of aluminum clad nuclear fuel elements. Such elements are dissolved in nitric acid using mercury nitrate as a catalyst. This mercury may be recovered in metallic form by rapidly quenching the nitric acid reaction prior to or promptly after complete dissolution of the aluminum metal.

BRIEF DESCRIPTION OF THE DRAWINGS

FIG. 1 is a flow chart illustrating the method for recovery of mercury from process sludge.

DESCRIPTION OF THE PREFERRED EMBODIMENT

FIG. 1 is a flow chart illustrating the method for recovery of mercury from process sludge. The incoming material could also be a mercury bearing solution.

In step 1, sludge 10 is added to reaction vessel 20, where it is allowed to react with heated nitric acid. This results in the formation of effluent 30 containing mercury nitrate. Step 1 is not required if the waste fluid or sludge from which mercury is to be recovered already contains nitric acid, as is the case when aluminum clad nuclear fuel elements are being dissolved.

In step 2, effluent 30 is placed into contact with aluminum metal in reaction vessel 40. This is preferably powdered aluminum. However, it can also be the cladding of a nuclear fuel element. As the aluminum is oxidized by the nitric acid in effluent 30, nitrated mercury is reduced to mercury metal. Since the rate of nitration of mercury metal in nitric acid is rather slow, relative to the rate of aluminum metal reaction, metallic mercury tends to accumulate in the reaction vessel.

The nitrating power of the nitric acid solution with respect to metallic mercury is positively correlated with the temperature and with the concentration of the acid.

In step 3, metallic mercury 50 which accumulates as the result of step 2 is continually removed from the bottom of the reaction vessel 40 via drain valve 60. Alternatively, when a large pool of mercury has accumulated, the re-nitration of the mercury can be prevented by rapidly reducing the nitrating power of the nitric acid, by means of dilution or reduction in temperature, or by drawing off liquid mercury before it has a chance to react. Dilution, cooling, and mercury removal are all means of quenching the mercury re-nitration reaction.

If the dilution or cooling approach to reaction quenching is to be used, it is important to time the quenching properly. The catalytic oxidation of aluminum by mercuric ion proceeds rapidly, resulting in reduction of mercury ion to metal. The second part of the catalytic cycle, the oxidation of mercury metal to mecuric ion, proceeds comparatively slowly. Therefore, in the mercury recovery process, the bulk of the available mercury is converted from the ionic form to the metal form in a relatively short time. At this point, a steady state is achieved, and a fixed amount of metallic mercury will be present in the reaction vessel. This fixed amount of mercury will remain until such time as the aluminum is dissolved. When the aluminum is dissolved and, therefore, when generation of mercury metal ceases, the size of the mercury pool will begin to decrease as mercury is nitrated back into solution. This is the best time to quench the reaction if it is desired to dissolve a maximum amount of aluminum yet recover a maximum amount of mercury metal.

The optimum process end time can be detected by observing the size of the accumulated mercury pool, or by observing the concentration of solvated mercury ion in real time, using X-ray fluorescent equipment or an ion electrode. Mercury analytical monitoring is set up prior to starting a process so that an entire run may be monitored. The process is allowed to proceed after the addition of aluminum until the mercury ion content of the solution drops to a very low concentration (0.001M or below) and there approaches a steady state. This happens in about an hour if good vessel mixing is provided, and, of course, assuming that only catalytic quantities of mercury nitrate are present. If excess aluminum is present, the nitric acid will be consumed, and this will be the end point. Metallic mercury and aluminum can be recovered from the vessel and subjected to physical separation. If excess aluminum is not present, the concentration of mercury ion in solution will thereafter begin to increase at such time as the last of the aluminum is consumed. This is the optimum point to quench the reaction and recover the metallic mercury present.

Two laboratory scale examples of the process are here presented:

EXAMPLE I:

Recovery of Mercury From Clean Nitric Acid Solutions

Prodecure:

1. A 100 ml solution of 1M nitric acid was made up in a 250 ml Erlenmeyer flask.

2. A 5 to 10 g. portion of mercuric nitrate crystals was dissolved in the nitric acid.

3. 1 to 2 gm aluminum metal powder was added to the acid solution and stirred to make a homogeneous mixture.

4. The mixture was placed on a hot plate and heated to 60–70 degrees C. This initiated reaction with the aluminum metal.

5. The heat was turned down and the reaction was allowed to proceed for a brief period (10–15 minutes).

6. When a sizeable ball of mercury was observed at the bottom of the reaction flask, the reaction was quenched by addition of cold water.

7. The effluent was removed, and the metallic mercury was recovered from the bottom of the reaction flask. The mercury was removed and rinsed with distilled water. No deterioration was apparent in the mercury after storage for several days in a clean vial.

EXAMPLE II:

Recovery of Mercury From Clay-Water Mixture

Procedure:

1. A mixture of 100 g. water and 100 g. clay (Peerless #2 AF) was made up in a 400 ml beaker.

2. A 10 gm portion of mercury nitrate was added and stirred into the clay-water mixture.

3. 5 ml of nitric acid was added to the mixture until the resulting liquid was about 0.5 to 1M in nitric acid.

4. The resulting mixture was then centrifuged to remove the solid clay fraction.

5. 5 g. aluminum metal powder was added to the clear centrifuged liquid.

6. The beaker with the liquid and aluminum powder was placed on a hot plate and heated to about 65° to 70° C. to initiate a reaction.

7. The hot plate was turned off, but the reaction was allowed to continue for about 20 minutes.

8. A large pool of mercury was visible in the bottom of the reaction vessel after 20 minutes. The reaction was immediately quenched with water.

9. The liquid mercury and remaining aluminum was recovered, and the remaining aluminum powder was removed by sluicing with distilled water. A 5 g. pool of mercury was recovered. This was approximately 80% of the mercury in the vessel.

The foregoing is intended to describe the invention. The limits of the invention are to be determined according to the following claims.

What is claimed is:

1. In a process wherein a nuclear fuel element, with a cladding comprising aluminum, is subjected to a reaction with a solution comprising water, nitric acid and mercury nitrate in-a reaction vessel, and wherein mercury acts as a catalyst, a method for receiving metallic mercury from said solution, comprising the steps of:

first, reacting said cladding to dissolve said aluminum, whereby mercury nitrate is caused to be converted to metallic mercury; and second, removing said metallic mercury from said reaction vessel prior to re-nitration of said mercury by said nitric acid.

2. The method of claim 1 wherein said quenching step comprises the step of drawing off metallic mercury from said reaction vessel.

3. In a process for recycling nuclear fuel elements possessing a cladding comprising aluminum, wherein the elements are subjected to reaction with a solution comprising nitric acid in a reaction vessel, and wherein mercury acts as a catalyst, a method for recovering the mercury from said solution and said vessel, comprising the steps of:

promptly quenching said reaction after aluminum has been dissolved; and recovering accumulated metallic mercury from said reaction vessel.

4. A method for recovering metallic mercury from a fluid comprising water, nitric acid and mercury nitrate, contained in a reaction vessel, comprising the steps of: reacting aluminum metal with said fluid, whereby said mercury nitrate is converted to mercury metal; and, removing mercury metal from said reaction vessel prior to nitration of said metal by said nitric acid.

* * * * *